(12) United States Patent
Blumka et al.

(10) Patent No.: US 9,755,198 B2
(45) Date of Patent: Sep. 5, 2017

(54) BATTERY CELL ASSEMBLY

(71) Applicant: LG Chem, Ltd., Seoul (KR)

(72) Inventors: Joseph Blumka, Shelby Township, MI (US); Paul Laurain, Sterling Heights, MI (US); Anthony Arena, Macomb, MI (US)

(73) Assignee: LG Chem, Ltd., Seoul (KR)

( * ) Notice: Subject to any disclaimer, the term of this patent is extended or adjusted under 35 U.S.C. 154(b) by 222 days.

(21) Appl. No.: 14/877,147

(22) Filed: Oct. 7, 2015

(65) Prior Publication Data

US 2017/0104194 A1    Apr. 13, 2017

(51) Int. Cl.
*H01M 2/10* (2006.01)
*H01M 10/0525* (2010.01)
*H01M 10/052* (2010.01)

(52) U.S. Cl.
CPC ....... *H01M 2/1022* (2013.01); *H01M 2/1077* (2013.01); *H01M 2/1094* (2013.01); *H01M 10/0525* (2013.01); *H01M 10/052* (2013.01); *H01M 2220/30* (2013.01)

(58) Field of Classification Search
CPC combination set(s) only.
See application file for complete search history.

(56) References Cited

U.S. PATENT DOCUMENTS

| 1,587,425 A | 6/1926 | Otto | |
| 4,053,688 A * | 10/1977 | Perkins | G04C 3/005 368/88 |
| 5,555,950 A * | 9/1996 | Harada | H01M 2/1083 180/232 |
| 2002/0012833 A1 | 1/2002 | Gow et al. | |
| 2002/0086201 A1 | 7/2002 | Payen et al. | |
| 2002/0182493 A1 | 12/2002 | Ovshinsky et al. | |

(Continued)

FOREIGN PATENT DOCUMENTS

| CN | 1385917 A | 12/2002 |
| CN | 101101997 A | 1/2008 |

(Continued)

OTHER PUBLICATIONS

"Gasket". Merriam-Webster. Merriam-Webster. Web. May 30, 2012. <http://www.merriam-webster.com/dictionary/gasket>.

(Continued)

*Primary Examiner* — Kaity Chandler
(74) *Attorney, Agent, or Firm* — Buckert Patent & Trademark Law Firm PC; John F. Buckert

(57) ABSTRACT

A battery cell assembly is provided. The battery cell assembly includes a first frame assembly having a first substantially rectangular ring-shaped frame and a first coupling member. The first coupling member of the first frame assembly has a first tongue portion with first and second resilient arm members. The battery cell assembly further includes a second frame assembly having a second substantially rectangular ring-shaped frame and a first coupling member. The first coupling member of the second frame assembly has a female member with a first aperture such that the first and second resilient arm members extend through the first aperture and engage an engagement surface defined by the female member of the first coupling member of the second frame assembly.

11 Claims, 17 Drawing Sheets

(56) References Cited

U.S. PATENT DOCUMENTS

| | | |
|---|---|---|
| 2003/0017384 A1 | 1/2003 | Marukawa et al. |
| 2003/0080714 A1 | 5/2003 | Inoue et al. |
| 2003/0189104 A1 | 10/2003 | Watanabe et al. |
| 2003/0211384 A1 | 11/2003 | Hamada et al. |
| 2004/0069474 A1 | 4/2004 | Wu et al. |
| 2004/0121205 A1 | 6/2004 | Blanchet |
| 2005/0026014 A1 | 2/2005 | Fogaing et al. |
| 2005/0089750 A1 | 4/2005 | Ng et al. |
| 2005/0103486 A1 | 5/2005 | Demuth et al. |
| 2005/0110460 A1 | 5/2005 | Arai et al. |
| 2005/0134038 A1 | 6/2005 | Walsh |
| 2006/0234119 A1 | 10/2006 | Kruger et al. |
| 2006/0286450 A1 | 12/2006 | Yoon et al. |
| 2007/0062681 A1 | 3/2007 | Beech |
| 2007/0087266 A1 | 4/2007 | Bourke et al. |
| 2007/0227166 A1 | 10/2007 | Rafalovich et al. |
| 2008/0003491 A1 | 1/2008 | Yahnker et al. |
| 2008/0041079 A1 | 2/2008 | Nishijima et al. |
| 2008/0110189 A1 | 5/2008 | Alston et al. |
| 2008/0182151 A1 | 7/2008 | Mizusaki et al. |
| 2012/0019061 A1* | 1/2012 | Nishihara .......... H01M 2/1077 307/10.1 |
| 2013/0244089 A1* | 9/2013 | Shimizu .............. H01M 2/1016 429/176 |
| 2013/0273412 A1* | 10/2013 | Okada ................ B60L 11/1877 429/158 |
| 2015/0072196 A1* | 3/2015 | Soleski .................. B60R 16/03 429/90 |
| 2015/0079451 A1* | 3/2015 | Jeong ................. H01M 2/1077 429/151 |
| 2016/0036018 A1* | 2/2016 | Gunna ................ H01M 10/625 429/100 |

FOREIGN PATENT DOCUMENTS

| | | |
|---|---|---|
| CN | 1754279 B | 9/2010 |
| DE | 19639115 A | 3/1998 |
| DE | 102008034860 A1 | 1/2010 |
| DE | 102009006426 A1 | 7/2010 |
| DE | 102010021922 A1 | 12/2011 |
| EP | 1577966 A | 9/2005 |
| EP | 1852925 A | 11/2007 |
| EP | 2065963 A2 | 6/2009 |
| EP | 2200109 A2 | 6/2010 |
| EP | 2262048 A | 12/2010 |
| GB | 481891 A | 3/1938 |
| JP | 08111244 A | 4/1996 |
| JP | H09129213 A | 5/1997 |
| JP | 19970199186 | 7/1997 |
| JP | H09219213 A | 8/1997 |
| JP | 2001105843 A | 4/2001 |
| JP | 2002038033 A | 2/2002 |
| JP | 2002319383 A | 10/2002 |
| JP | 2002333255 A | 11/2002 |
| JP | 2003188323 A | 7/2003 |
| JP | 2003282112 A | 10/2003 |
| JP | 2004333115 A | 11/2004 |
| JP | 2005126315 A | 5/2005 |
| JP | 2005147443 A | 6/2005 |
| JP | 2005349955 A | 12/2005 |
| JP | 2006512731 | 4/2006 |
| JP | 2006125835 | 5/2006 |
| JP | 2006139928 A | 6/2006 |
| JP | 2007107684 | 4/2007 |
| JP | 2007305425 A | 11/2007 |
| JP | 2008054379 A | 3/2008 |
| JP | 2008062875 A | 3/2008 |
| JP | 2008080995 A | 4/2008 |
| JP | 2008159440 A | 7/2008 |
| JP | 2009009889 A | 1/2009 |
| JP | 2009054297 A | 3/2009 |
| KR | 20050092605 A | 9/2005 |
| KR | 100637472 B1 | 10/2006 |
| KR | 100765659 B1 | 10/2007 |
| KR | 20080047641 A | 5/2008 |
| KR | 20090082212 A | 7/2009 |
| KR | 100921346 B1 | 10/2009 |
| KR | 20090107443 A | 10/2009 |
| KR | 20100119497 A | 9/2010 |
| KR | 20100119498 A | 9/2010 |
| KR | 20100115709 A | 10/2010 |
| KR | 1020100119497 A | 11/2010 |
| KR | 1020100119498 A | 11/2010 |
| KR | 20110013269 | 2/2011 |
| KR | 1020110013269 A | 2/2011 |
| KR | 1020110013270 A | 2/2011 |
| KR | 20110126764 A | 11/2011 |
| KR | 20130024761 | 3/2013 |

OTHER PUBLICATIONS

International Search Report for International application No. PCT/KR2013/004015 dated Sep. 26, 2013.
International Search Report; International Application No. PCT/KR2009/000258; International Filing Date: Jan. 16, 2009; dated Aug. 28, 2009; 2 pages.
International Search Report; International Application No. PCT/KR2009/003428, International Filing Date: Jun. 25, 2009; dated Jan. 22, 2010; 2 pages.
International Search Report; International Application No. PCT/KR2009/003429; International Filing Date: Jun. 25, 2009; dated Jan. 12, 2010; 3 pages.
International Search Report; International Application No. PCT/KR2009/003430; International Filing Date: Jun. 25, 2009; dated Feb. 3, 2010; 2 pages.
International Search Report; International Application No. PCT/KR2009/003434; International Filing Date: Jun. 25, 2009; dated Jan. 18, 2010; 2 pages.
International Search Report; International Application No. PCT/KR2009/003436; International Filing Date: Jun. 25, 2009; dated Jan. 22, 2010; 2 pages.
International Search Report; International Application No. PCT/KR2009/006121; International Filing Date: Oct. 22, 2009; dated May 3, 2010; 2 pages.
International Search Report; International Application No. PCT/KR2010/002334; International Filing Date: Apr. 15, 2010; dated Nov. 29, 2010; 2 pages.
International Search Report; International Application No. PCT/KR2010/002336; International Filing Date: Apr. 15, 2010; dated Jan. 31, 2011; 2 pages.
International Search Report; International Application No. PCT/KR2010/002337; International Filing Date: Apr. 15, 2010; dated May 3, 2010; 2 pages.
International Search Report; International Application No. PCT/KR2010/002340; International Filing Date: Apr. 15, 2010; dated Jan. 31, 2011; 2 pages.
International Search Report; International Application No. PCT/KR2010/004944; International Filing Date: Jul. 28, 2010; dated Apr. 29, 2011; 2 pages.
International Search Report; International Application No. PCT/KR2010/005639; International Filing Date: Aug. 24, 2010; dated Jun. 3, 2011; 2 pages.
U.S. Appl. No. 14/273,572, filed May 9, 2014 entitled Battery Pack and Method of Assembling the Battery Pack.
U.S. Appl. No. 14/328,000, filed Jul. 10, 2014 entitled Battery System and Method of Assembling the Battery System.
U.S. Appl. No. 14/330,163, filed Jul. 14, 2014 entitled Battery System and Method for Cooling the Battery System.
U.S. Appl. No. 14/511,389, filed Oct. 10, 2014 entitled Battery Cell Assembly.
U.S. Appl. No. 14/531,696, filed Nov. 3, 2014 entitled Battery Pack.

* cited by examiner

BATTERY CELL ASSEMBLY

BACKGROUND

The inventors herein have recognized a need for a battery cell assembly having an improved structure for coupling frame assemblies together.

SUMMARY

A battery cell assembly in accordance with an exemplary embodiment is provided. The battery cell assembly includes a first frame assembly having a first substantially rectangular ring-shaped frame and a first coupling member such that a first plane extends through the first substantially rectangular ring-shaped frame and the first coupling member. The first coupling member of the first frame assembly is coupled to and extends outwardly from a first side wall of the first substantially rectangular ring-shaped frame in a first direction. The first coupling member of the first frame assembly is coupled proximate to a first end of the first side wall of the first substantially rectangular ring-shaped frame. The first coupling member of the first frame assembly has a first tongue portion with first and second resilient arm members. The battery cell assembly further includes a second frame assembly having a second substantially rectangular ring-shaped frame and a first coupling member such that a second plane extends through the second substantially rectangular ring-shaped frame and the first coupling member thereof. The first coupling member of the second frame assembly is coupled to and extends outwardly from a first side wall of the second substantially rectangular ring-shaped frame in the first direction. The first coupling member of the second frame assembly is coupled proximate to a first end of the first side wall of the second substantially rectangular ring-shaped frame. The first coupling member of the second frame assembly has a female member with a first aperture such that the first and second resilient arm members of the first tongue portion of the first coupling member of the first frame assembly extend through the first aperture and engage an engagement surface defined by the female member of the first coupling member of the second frame assembly to couple the first frame assembly to the second frame assembly. The battery cell assembly further includes a first battery cell disposed between the first frame assembly and the second frame assembly.

DETAILED DESCRIPTION

Figure 1:
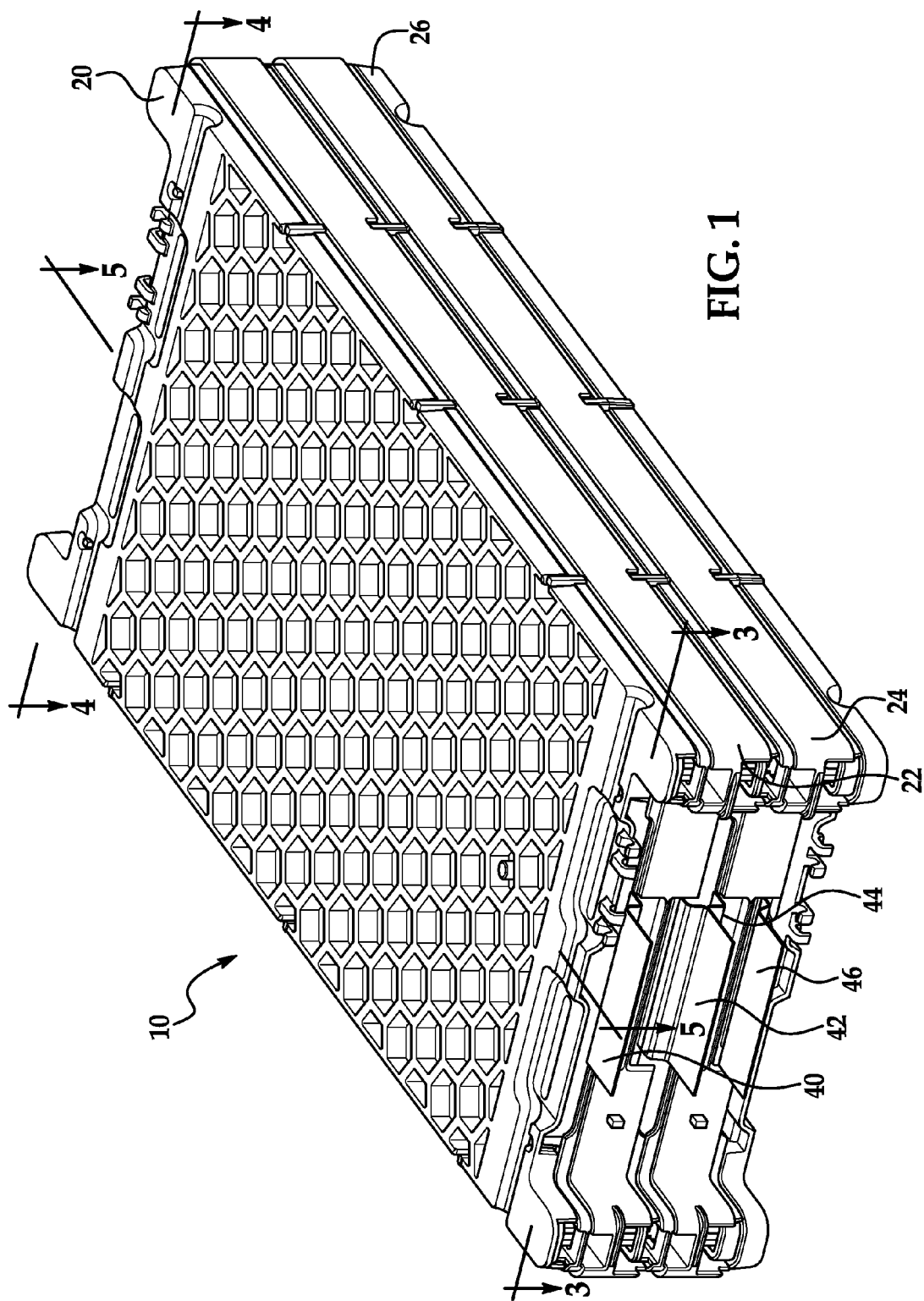
FIG. 1 is a schematic of a battery cell assembly in accordance with an exemplary embodiment.
Figure 2:
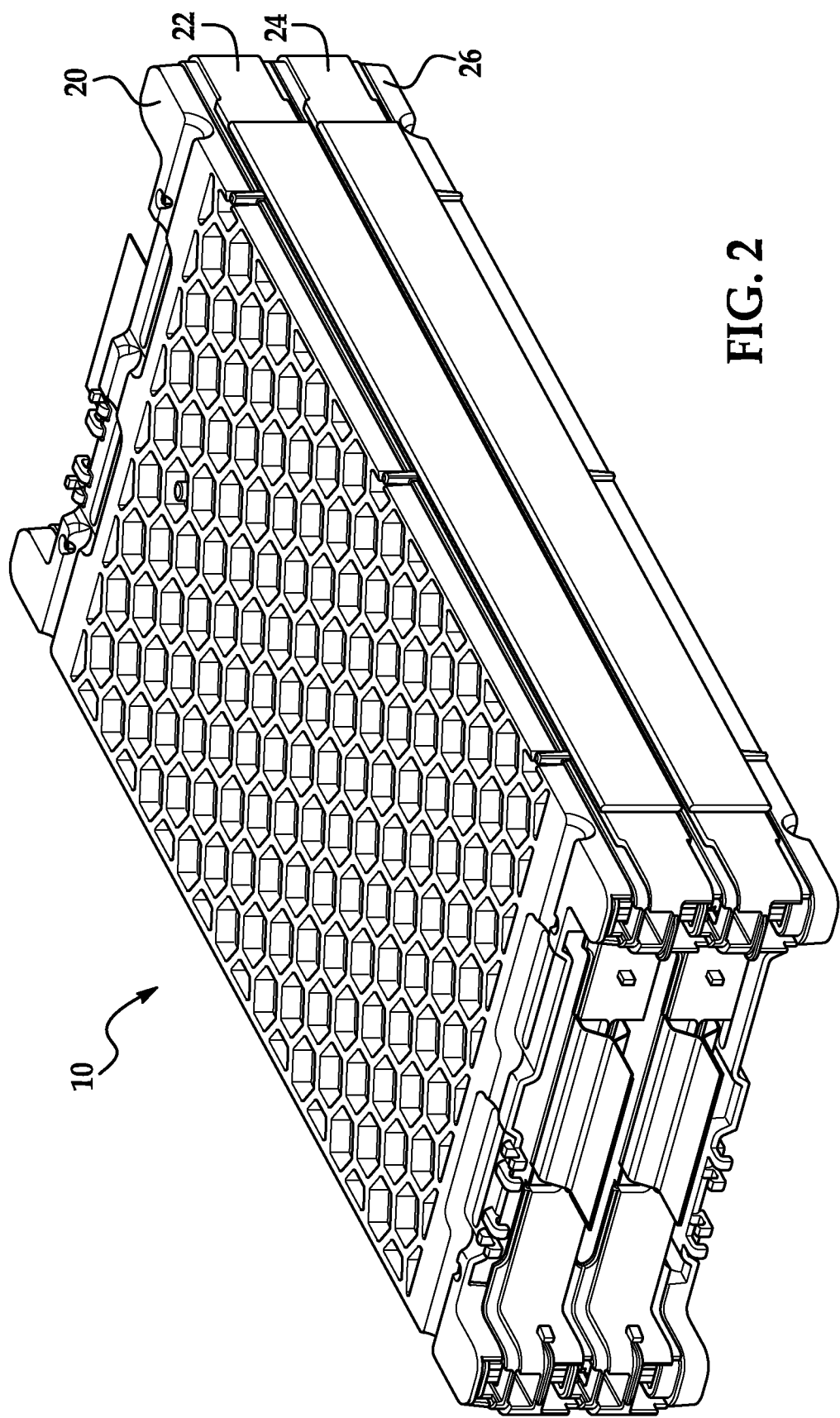
FIG. 2 is another schematic of the battery cell assembly of FIG. 1.

Referring to FIGS. 1-5, a battery cell assembly 10 in accordance with an exemplary embodiment is provided. The battery cell assembly 10 includes frame assemblies 20, 22, 24, 26 and battery cells 40, 42, 44, 46. An advantage of the battery cell assembly 10 is that the frame assemblies 22, 24 each have coupling members with tongue portions having resilient arm members, and coupling members with female members that can easily couple the frame assembly 22 to the frame assembly 24.

Referring to FIGS. 3 and 5-7, the frame assembly 20 is removably coupled to the frame assembly 22 such that the battery cell 40 is disposed between the frame assemblies 20, 22. The frame assembly 20 includes a rectangular-shaped frame 60 and coupling members 62, 64, 66, 68. In an exemplary embodiment, the frame assembly 20 is constructed of plastic. Of course, in an alternative embodiment, the frame assembly 20 could be constructed of other electrically insulative materials. The rectangular-shaped frame 60 has a first end 80 and a second end 82. The coupling members 62, 64 extend outwardly from the first end 80 in a first direction and are configured to removably engage the coupling members 172, 174, respectively (shown in FIG. 8) of the frame assembly 22 to couple the frame assemblies 20, 22 together. Further, the coupling members 66, 68 extend outwardly from the second end 82 and are configured to removably engage the coupling members 176, 178, respectively (shown in FIG. 8) of the frame assembly 22 to couple the frame assemblies 20, 22 together.

Figure 3:
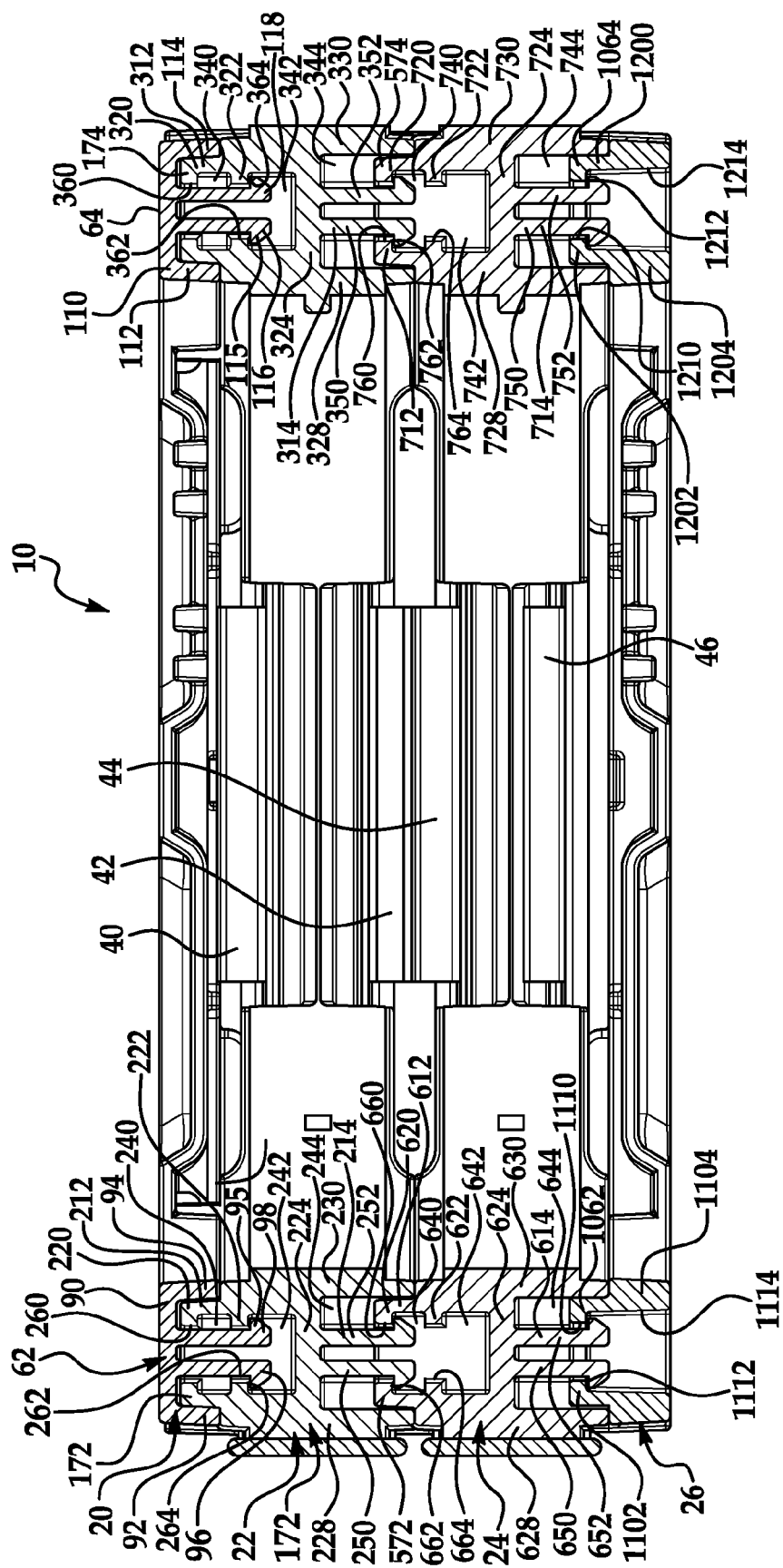
FIG. 3 is a cross-sectional schematic of the battery cell assembly of FIG. 1 taken along lines 3-3.
Figure 7:
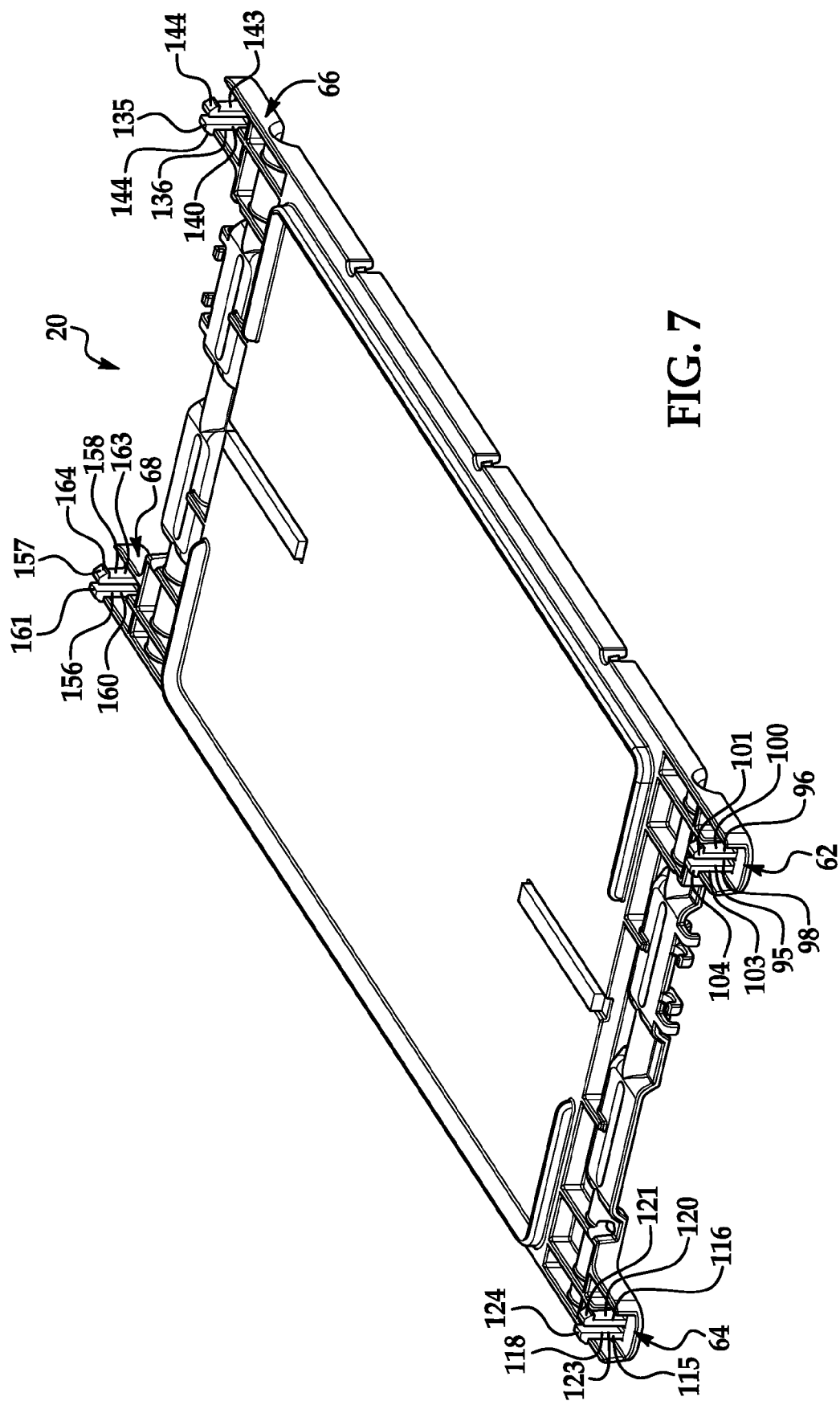
FIG. 7 is another schematic of the first frame assembly of FIG. 6.
Figure 8:
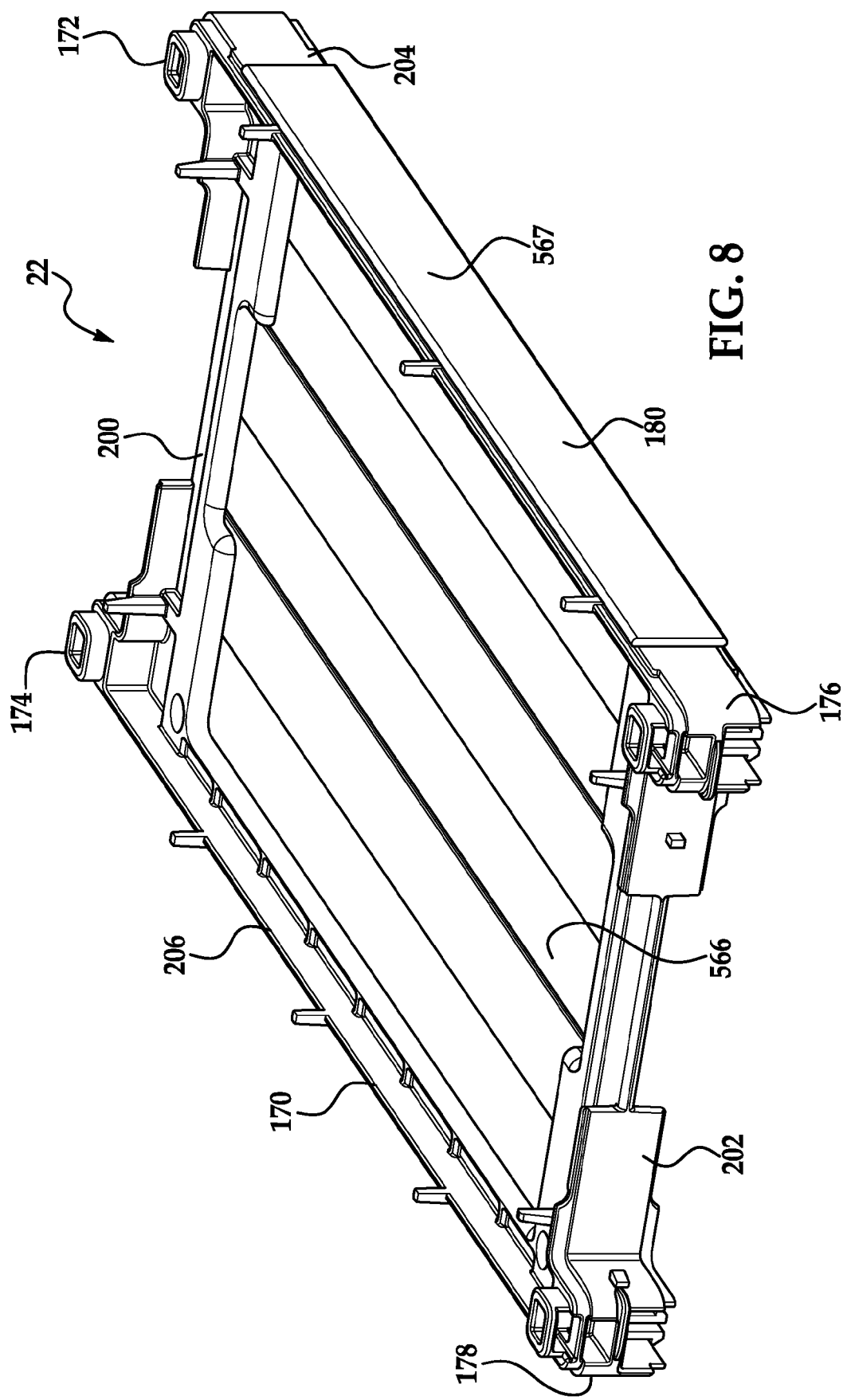
FIG. 8 is a schematic of a second frame assembly utilized in the battery cell assembly of FIG. 1.

Referring to FIGS. 3, 7 and 8, the coupling member 62 removably engages the coupling member 172 of the frame assembly 22. The coupling member 62 includes a horizontal wall 90, vertical walls 92, 94, and a tongue portion 95. The vertical walls 92, 94 are coupled to the horizontal wall 90 and extend downwardly from the horizontal wall 90 substantially parallel to one another. Further, the vertical walls 92, 94 are spaced apart from one another. The tongue portion 95 includes resilient arm members 96, 98. The resilient arm members 96, 98 are coupled to the horizontal wall 90 and extend downwardly from the horizontal wall 90 substantially parallel to one another. Further, the resilient arm members 96, 98 are spaced apart from one another and are each disposed between bottom portions of the vertical walls 92, 94. The resilient arm member 96 includes a shaft portion 100 and a latch portion 101 coupled to an end of the shaft portion 100. The resilient arm member 98 includes a shaft portion 103 and a latch portion 104 coupled to an end of the shaft portion 103. The latch portions 101, 104 of the resilient arm members 96, 98, respectively, removably engage an engagement surface 264 (shown in FIG. 3) of the coupling member 172.

The coupling member 64 removably engages the coupling member 174 (shown in FIG. 8) of the frame assembly 22. The coupling member 64 includes a horizontal wall 110, vertical walls 112, 114, and a tongue portion 115. The vertical walls 112, 114 are coupled to the horizontal wall 110 and extend downwardly from the horizontal wall 110 substantially parallel to one another. Further, the vertical walls 112, 114 are spaced apart from one another. The tongue portion 115 includes resilient arm members 116, 118. The resilient arm members 116, 118 are coupled to the horizontal wall 110 and extend downwardly from the horizontal wall 110 substantially parallel to one another. Further, the resilient arm members 116, 118 are spaced apart from one another and are each disposed between bottom portions of the vertical walls 112, 114. The resilient arm member 116 includes a shaft portion 120 and a latch portion 121 coupled to an end of the shaft portion 120. The resilient arm member 118 includes a shaft portion 123 and a latch portion 124 coupled to an end of the shaft portion 123. The latch portions 121, 124 of the resilient arm members 116, 118, respectively, removably engage an engagement surface 364 (shown in FIG. 3) of the coupling member 174.

Figure 4:
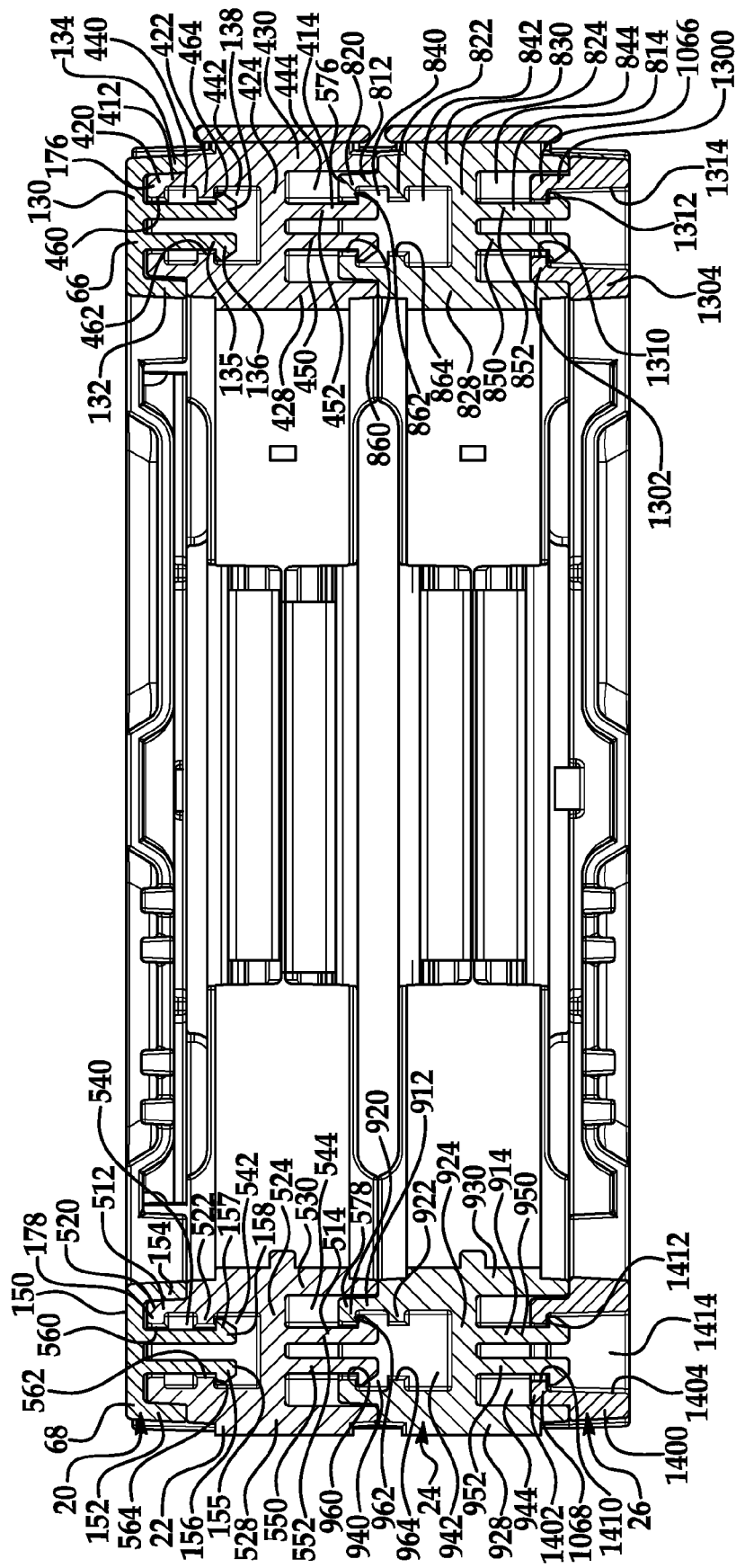
FIG. 4 is another cross-sectional schematic of the battery cell assembly of FIG. 1 taken along lines 4-4.

Referring to FIGS. 4, 7 and 8, the coupling member 66 removably engages the coupling member 176 of the frame assembly 22. The coupling member 66 includes a horizontal wall 130, vertical walls 132, 134, and a tongue portion 135. The vertical walls 132, 134 are coupled to the horizontal wall 130 and extend downwardly from the horizontal wall 130 substantially parallel to one another. Further, the vertical walls 132, 134 are spaced apart from one another. The tongue portion 135 includes resilient arm members 136, 138. The resilient arm members 136, 138 are coupled to the horizontal wall 130 and extend downwardly from the horizontal wall 130 substantially parallel to one another. Further, the resilient arm members 136, 138 are spaced apart from one another and are each disposed between bottom portions of the vertical walls 132, 134. The resilient arm member 136 includes a shaft portion 140 and a latch portion 141 coupled to an end of the shaft portion 140. The resilient arm member 138 includes a shaft portion 143 and a latch portion 144 coupled to an end of the shaft portion 143. The latch portions 141, 144 of the resilient arm members 136, 138, respectively, removably engage an engagement surface 464 (shown in FIG. 4) of the coupling member 176.

The coupling member 68 removably engages the coupling member 178 (shown in FIG. 8) of the frame assembly 22. The coupling member 68 includes a horizontal wall 150, vertical walls 152, 154, and a tongue portion 155. The vertical walls 152, 154 are coupled to the horizontal wall 150 and extend downwardly from the horizontal wall 150 substantially parallel to one another. Further, the vertical walls 152, 154 are spaced apart from one another. The tongue portion 155 includes resilient arm members 156, 158. The resilient arm members 156, 158 are coupled to the horizontal wall 150 and extend downwardly from the horizontal wall 150 substantially parallel to one another. Further, the resilient arm members 156, 158 are spaced apart from one another and are each disposed between bottom portions of the vertical walls 152, 154. The resilient arm member 156 includes a shaft portion 160 and a latch portion 161 coupled to an end of the shaft portion 160. The resilient arm member 158 includes a shaft portion 163 and a latch portion 164 coupled to an end of the shaft portion 163. The latch portions 161, 164 of the resilient arm members 156, 158, respectively, removably engage an engagement surface 564 (shown in FIG. 4) of the coupling member 178.

Referring to FIGS. 3, 4, 5 and 8-11, the frame assembly 22 is removably coupled to the frame assembly 20 such that the battery cell 40 is disposed between the frame assemblies 20, 22. Further, the frame assembly 22 is removably coupled to the frame assembly 24 such that the battery cells 42, 44 are disposed between the frame assemblies 22, 24.

The frame assembly 22 includes a substantially rectangular ring-shaped frame 170, coupling members 172, 174, 176, 178, and a solid cooling fin 180. In an exemplary embodiment, the substantially rectangular ring-shaped frame 170 and the coupling members 172, 174, 176, 178 are constructed of plastic. Of course, in an alternative embodiment, the substantially rectangular ring-shaped frame 170 and the coupling members 172, 174, 176, 178 could be constructed of other electrically insulative materials. A plane 182 (shown in FIG. 9) extends through the substantially rectangular ring-shaped frame 170, the coupling members 172, 174, 176, 178, and the solid cooling fin 180.

Referring to FIG. 8, the substantially rectangular ring-shaped frame 170 has a first side wall 200, a second side wall 202, a third side wall 204, and a fourth side wall 206. The first and second side walls 200, 202 extend substantially parallel to one another and are coupled to and between the third and fourth side walls 204, 206. The third and fourth side walls 204, 206 extend substantially parallel to one another and substantially perpendicular to the first and second side walls 200, 202.

Referring to FIGS. 3 and 8, the coupling member 172 is coupled to and extends outwardly from the first side wall 200 in a first direction. The coupling member 172 is coupled proximate to a first end of the first side wall 200. The coupling member 172 includes a female member 212 and a tongue portion 214 coupled to the female member 212.

The female member 212 includes horizontal walls 220, 222, 224 and vertical walls 228, 230. The horizontal walls 220, 222, 224 extend parallel to one another and parallel to the first plane 182 (shown in FIG. 9) and are spaced apart from one another. The vertical walls 228, 230 are coupled to the horizontal walls 220, 222, 224. The horizontal walls 220, 222 have a cavity 240 therebetween. The horizontal walls 222, 224 have a cavity 242 therebetween. The horizontal wall 224 and the vertical walls 228, 230 define a cavity 244 on a side of the horizontal wall 224 that is opposite to the side of the horizontal wall 224 communicating with the cavity 242. Further, the horizontal wall 220 has an aperture 260 extending therethrough. The horizontal wall 222 has an aperture 262 extending therethrough, and has an engagement surface 264 communicating with the cavity 242. The engagement surface 264 engages the resilient arms 96, 98 of the coupling member 62 of the frame assembly 20.

Figure 9:
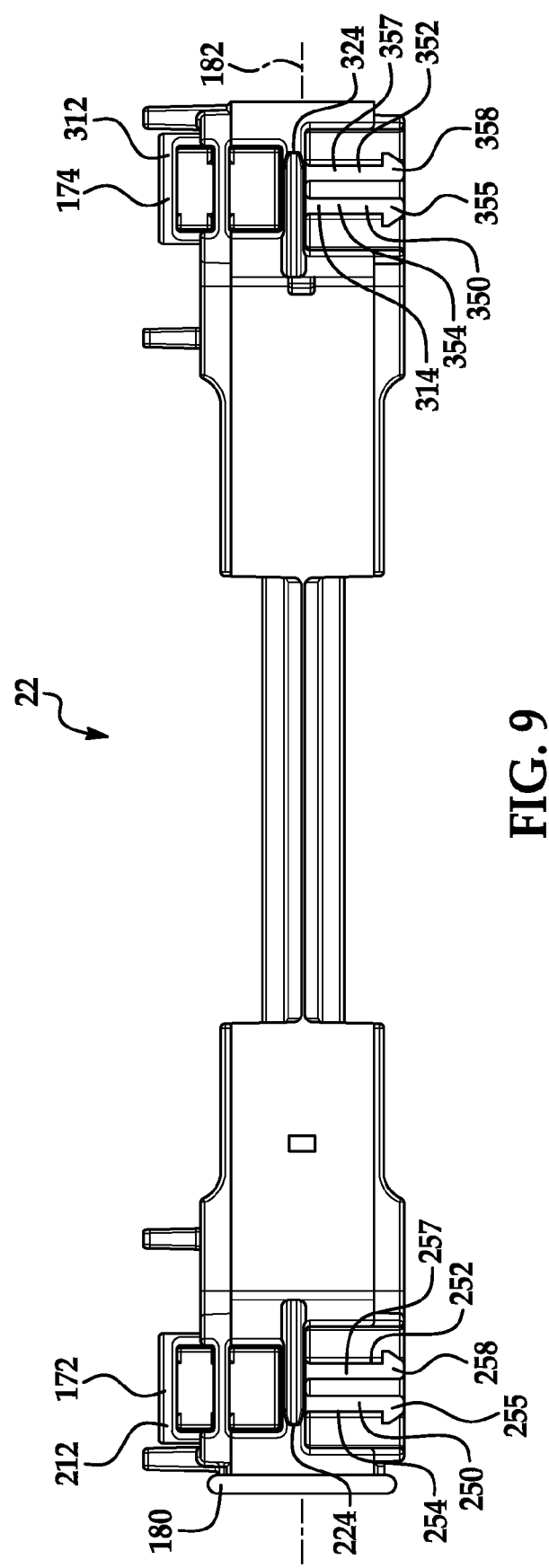
FIG. 9 is a side view of the second frame assembly of FIG. 8.
Figure 10:
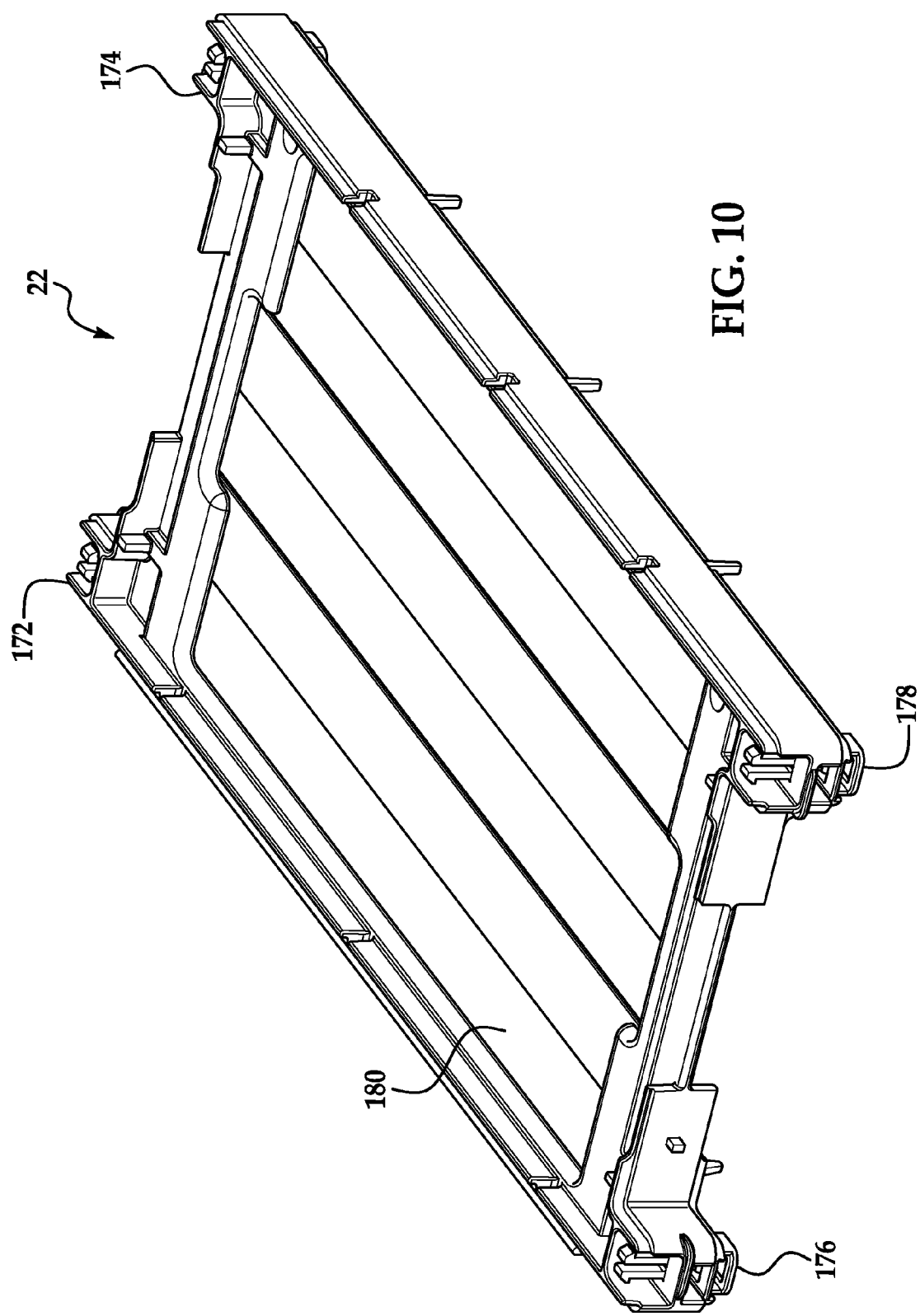
FIG. 10 is another schematic of the second frame assembly of FIG. 8.

Referring to FIGS. 3 and 9, the tongue portion 214 includes resilient arm members 250, 252. The resilient arm members 250, 252 are coupled to the horizontal wall 224 and extend downwardly from the horizontal wall 224 substantially parallel to one another. Further, the resilient arm members 250, 252 are spaced apart from one another and are each disposed between bottom portions of the vertical walls 228, 230. The resilient arm member 250 includes a shaft portion 254 and a latch portion 255 coupled to an end of the shaft portion 254. The resilient arm member 252 includes a shaft portion 257 and a latch portion 258 coupled to an end of the shaft portion 257. The latch portions 255, 258 of the resilient arm members 250, 252, respectively, removably engage an engagement surface 662 (shown in FIG. 3) of the coupling member 572 (shown in FIG. 12).

Referring to FIGS. 3 and 8, the coupling member 174 is coupled to and extends outwardly from the first side wall 200 in the first direction. The coupling member 174 is coupled proximate to a second end of the first side wall 200. The coupling member 174 includes a female member 312 and a tongue portion 314 coupled to the female member 312.

The female member 312 includes horizontal walls 320, 322, 324 and vertical walls 328, 330. The horizontal walls 320, 322, 324 extend parallel to one another and parallel to the first plane 182 (shown in FIG. 9) and are spaced apart from one another. The vertical walls 328, 330 are coupled to the horizontal walls 320, 322, 324. The horizontal walls 320, 322 have a cavity 340 therebetween. The horizontal walls 322, 324 have a cavity 342 therebetween. The horizontal wall 324 and the vertical walls 328, 330 define a cavity 344 on a side of the horizontal wall 324 that is opposite to the side of the horizontal wall 324 communicating with the cavity 342. Further, the horizontal wall 320 has an aperture 360 extending therethrough. The horizontal wall 322 has an aperture 362 extending therethrough, and has an engagement surface 364 communicating with the cavity 342. The engagement surface 364 engages the resilient arms 116, 118 of the coupling member 64 of the frame assembly 20.

Referring to FIGS. 3 and 9, the tongue portion 314 includes resilient arm members 350, 352. The resilient arm members 350, 352 are coupled to the horizontal wall 324 and extend downwardly from the horizontal wall 324 substantially parallel to one another. Further, the resilient arm members 350, 352 are spaced apart from one another and are each disposed between bottom portions of the vertical walls 328, 330. The resilient arm member 350 includes a shaft portion 354 and a latch portion 355 coupled to an end of the shaft portion 354. The resilient arm member 352 includes a shaft portion 357 and a latch portion 358 coupled to an end of the shaft portion 357. The latch portions 355, 358 of the resilient arm members 350, 352, respectively, removably engage an engagement surface 762 (shown in FIG. 3) of the coupling member 574 (shown in FIG. 12).

Referring to FIGS. 4 and 8, the coupling member 176 is coupled to and extends outwardly from the second side wall 202 in a second direction opposite to the first direction. The coupling member 176 is coupled proximate to a first end of the second side wall 202. The coupling member 176 includes a female member 412 and a tongue portion 414 coupled to the female member 412.

The female member 412 includes horizontal walls 420, 422, 424 and vertical walls 428, 430. The horizontal walls 420, 422, 424 extend parallel to one another and parallel to the first plane 182 (shown in FIG. 9) and are spaced apart from one another. The vertical walls 428, 430 are coupled to the horizontal walls 420, 422, 424. The horizontal walls 420, 422 have a cavity 440 therebetween. The horizontal walls 422, 424 have a cavity 442 therebetween. The horizontal wall 424 and the vertical walls 428, 430 define a cavity 444 on a side of the horizontal wall 424 that is opposite to the side of the horizontal wall 424 communicating with the cavity 442. Further, the horizontal wall 420 has an aperture 460 extending therethrough. The horizontal wall 422 has an aperture 462 extending therethrough, and has an engagement surface 464 communicating with the cavity 442. The engagement surface 464 engages the resilient arms 136, 138 of the coupling member 66 of the frame assembly 20.

Figure 11:
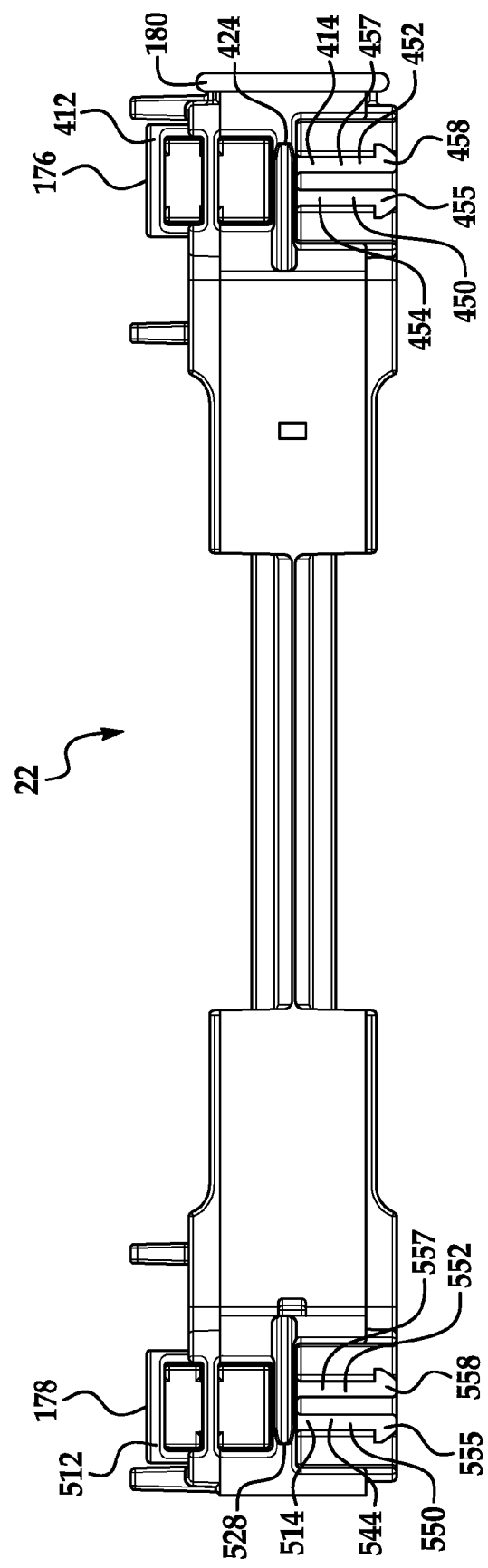
FIG. 11 is another side view of the second frame assembly of FIG. 8.

Referring to FIGS. 4 and 11, the tongue portion 414 includes resilient arm members 450, 452. The resilient arm members 450, 452 are coupled to the horizontal wall 424 and extend downwardly from the horizontal wall 424 substantially parallel to one another. Further, the resilient arm members 450, 452 are spaced apart from one another and are each disposed between bottom portions of the vertical walls 428, 430. The resilient arm member 450 includes a shaft portion 454 and a latch portion 455 coupled to an end of the shaft portion 454. The resilient arm member 452 includes a shaft portion 457 and a latch portion 458 coupled to an end of the shaft portion 457. The latch portions 455, 458 of the resilient arm members 450, 452, respectively, removably engage an engagement surface 862 (shown in FIG. 4) of the coupling member 576 (shown in FIG. 12).

Referring to FIGS. 4 and 8, the coupling member 178 is coupled to and extends outwardly from the second side wall 202 in the second direction opposite to the first direction. The coupling member 178 is coupled proximate to a second end of the second side wall 202. The coupling member 178 includes a female member 512 and a tongue portion 514 coupled to the female member 512.

The female member 512 includes horizontal walls 520, 522, 524 and vertical walls 528, 530. The horizontal walls 520, 522, 524 extend parallel to one another and parallel to the first plane 182 (shown in FIG. 9) and are spaced apart from one another. The vertical walls 528, 530 are coupled to the horizontal walls 520, 522, 524. The horizontal walls 520, 522 have a cavity 540 therebetween. The horizontal walls 522, 524 have a cavity 542 therebetween. The horizontal wall 524 and the vertical walls 528, 530 define a cavity 544 on a side of the horizontal wall 524 that is opposite to the side of the horizontal wall 524 communicating with the cavity 542. Further, the horizontal wall 520 has an aperture 560 extending therethrough. The horizontal wall 522 has an aperture 562 extending therethrough, and has an engagement surface 564 communicating with the cavity 542. The engagement surface 564 engages the resilient arms 156, 188 of the coupling member 68 of the frame assembly 20.

Referring to FIGS. 4 and 11, the tongue portion 514 includes resilient arm members 550, 552. The resilient arm members 550, 552 are coupled to the horizontal wall 524 and extend downwardly from the horizontal wall 524 substantially parallel to one another. Further, the resilient arm members 550, 552 are spaced apart from one another and are each disposed between bottom portions of the vertical walls 528, 530. The resilient arm member 550 includes a shaft portion 554 and a latch portion 555 coupled to an end of the shaft portion 554. The resilient arm member 552 includes a shaft portion 557 and a latch portion 558 coupled to an end of the shaft portion 557. The latch portions 555, 558 of the resilient arm members 550, 552, respectively, removably engage an engagement surface 962 (shown in FIG. 4) of the coupling member 578 (shown in FIG. 12).

Figure 5:
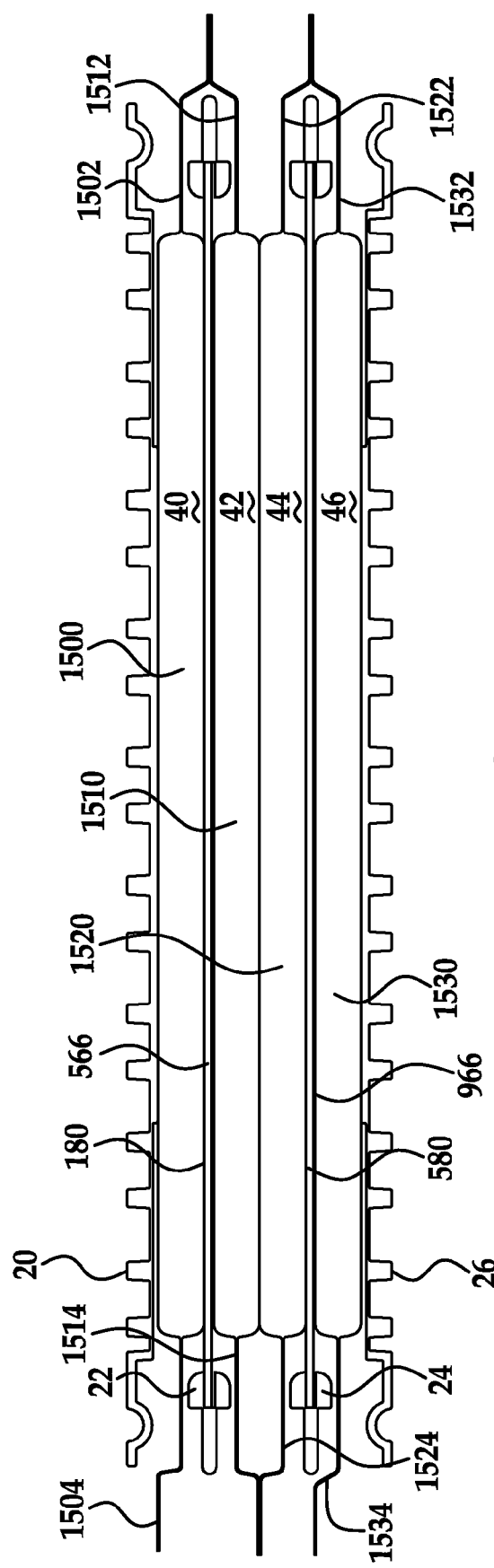
FIG. 5 is another cross-sectional schematic of the battery cell assembly of FIG. 1 taken along lines 5-5.
Figure 6:
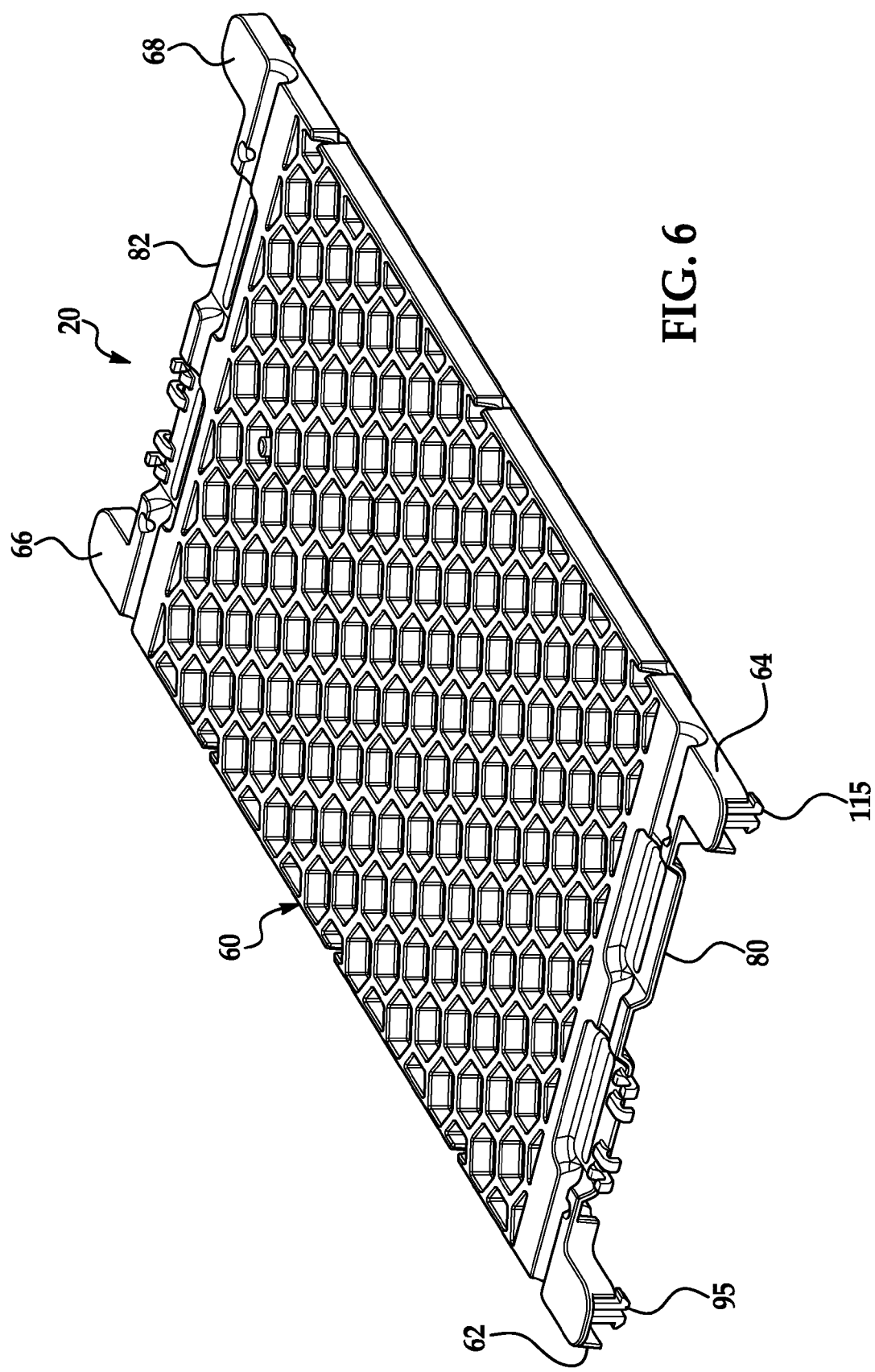
FIG. 6 is a schematic of a first frame assembly utilized in the battery cell assembly of FIG. 1.

Referring to FIGS. 5 and 8, the frame assembly 22 includes the solid cooling fin 180 having a first panel portion 566 and a second panel portion 567. The first panel portion 566 is at least partially encapsulated within the first, second, third, and fourth side walls 200, 202, 204, 206 of the substantially rectangular ring-shaped frame 170. The first panel portion 566 further extends through the third side wall 204. The second panel portion 567 is coupled to an end of the first panel portion 566 and is disposed directly on an exterior of the third side wall 204. The second panel portion 567 extends substantially perpendicular to the first panel portion 566. The battery cells 40, 42 are disposed directly against at least a portion of first panel portion 566 on opposite side of the first panel portion 566.

Referring to FIGS. 3, 4, 5 and 12-15, the frame assembly 24 is removably coupled to the frame assembly 22 such that the battery cells 42, 44 are disposed between the frame assemblies 22, 24. Further, the frame assembly 24 is removably coupled to the frame assembly 26 such that the battery cell 46 is disposed between the frame assemblies 24, 26.

The frame assembly 24 includes a substantially rectangular ring-shaped frame 570, coupling members 572, 574, 576, 578, and a solid cooling fin 580. In an exemplary embodiment, the substantially rectangular ring-shaped frame 570 and the coupling members 572, 574, 576, 578 are constructed of plastic. Of course, in an alternative embodiment, the substantially rectangular ring-shaped frame 570 and the coupling members 572, 574, 576, 578 could be constructed of other electrically insulative materials. A plane 582 (shown in FIG. 13) extends through the substantially rectangular ring-shaped frame 570, the coupling members 572, 574, 576, 578, and the solid cooling fin 580. The plane 582 is parallel to the plane 182 (shown in FIG. 9).

Figure 12:
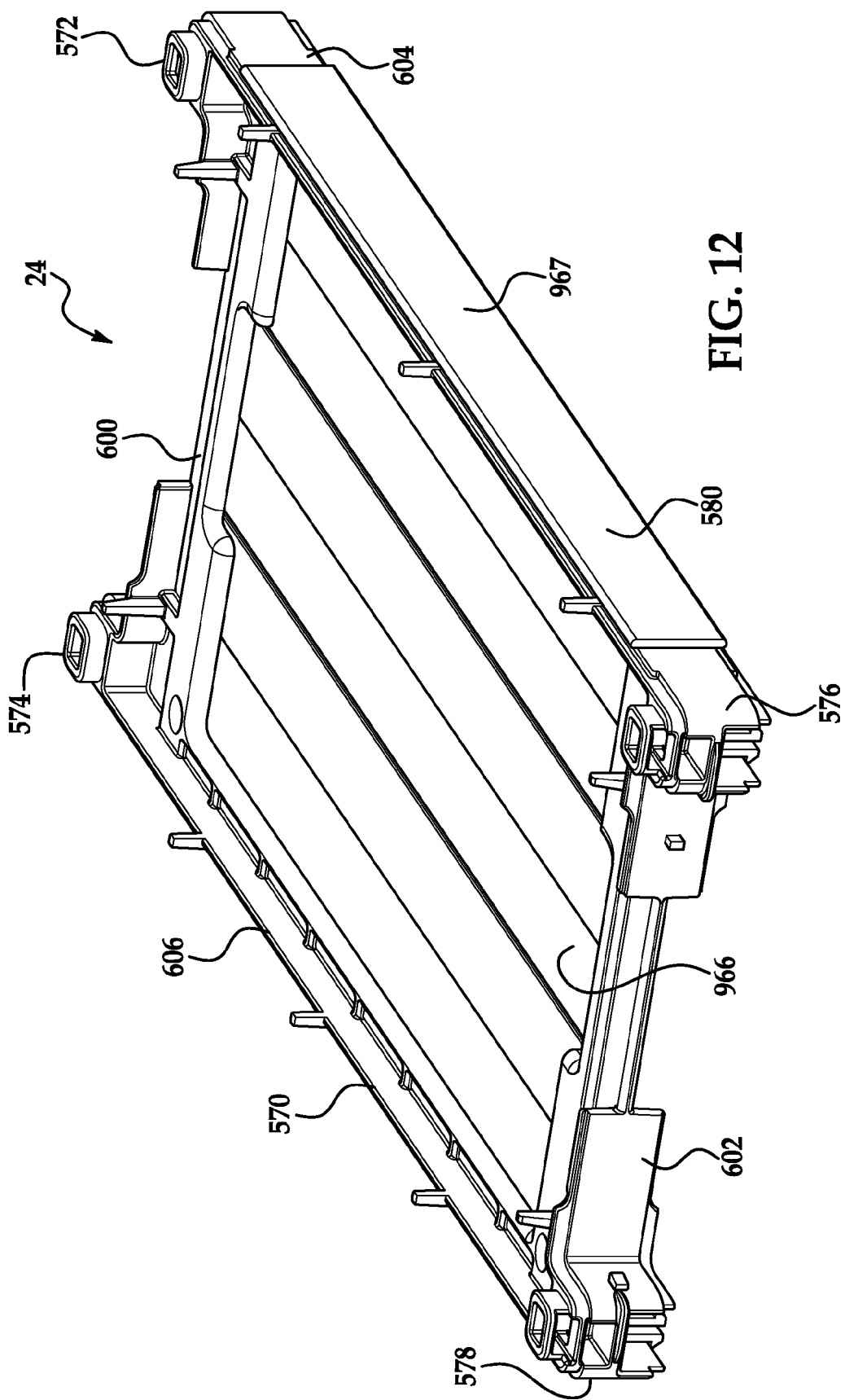
FIG. 12 is a schematic of a third frame assembly utilized in the battery cell assembly of FIG. 1.

Referring to FIG. 12, the substantially rectangular ring-shaped frame 570 has a first side wall 600, a second side wall 602, a third side wall 604, and a fourth side wall 606. The first and second side walls 600, 602 extend substantially parallel to one another and are coupled to and between the third and fourth side walls 604, 606. The third and fourth side walls 604, 606 extend substantially parallel to one another and substantially perpendicular to the first and second side walls 600, 602.

Referring to FIGS. 3 and 12, the coupling member 572 is coupled to and extends outwardly from the first side wall 600 in a first direction. The coupling member 572 is coupled proximate to a first end of the first side wall 600. The coupling member 572 includes a female member 612 and a tongue portion 614 coupled to the female member 612.

The female member 612 includes horizontal walls 620, 622, 624 and vertical walls 628, 630. The horizontal walls 620, 622, 624 extend parallel to one another and parallel to the second plane 582 (shown in FIG. 13) and are spaced apart from one another. The vertical walls 628, 630 are coupled to the horizontal walls 620, 622, 624. The horizontal walls 620, 622 have a cavity 640 therebetween. The horizontal walls 622, 624 have a cavity 642 therebetween. The horizontal wall 624 and the vertical walls 628, 630 define a cavity 644 on a side of the horizontal wall 624 that is opposite to the side of the horizontal wall 624 communicating with the cavity 642. Further, the horizontal wall 620 has an aperture 660 extending therethrough and has an engagement surface 662 communicating with the cavity 640. The horizontal wall 622 has an aperture 664 extending therethrough. The engagement surface 662 engages the resilient arms 250, 252 of the coupling member 172 of the frame assembly 22.

Figure 13:
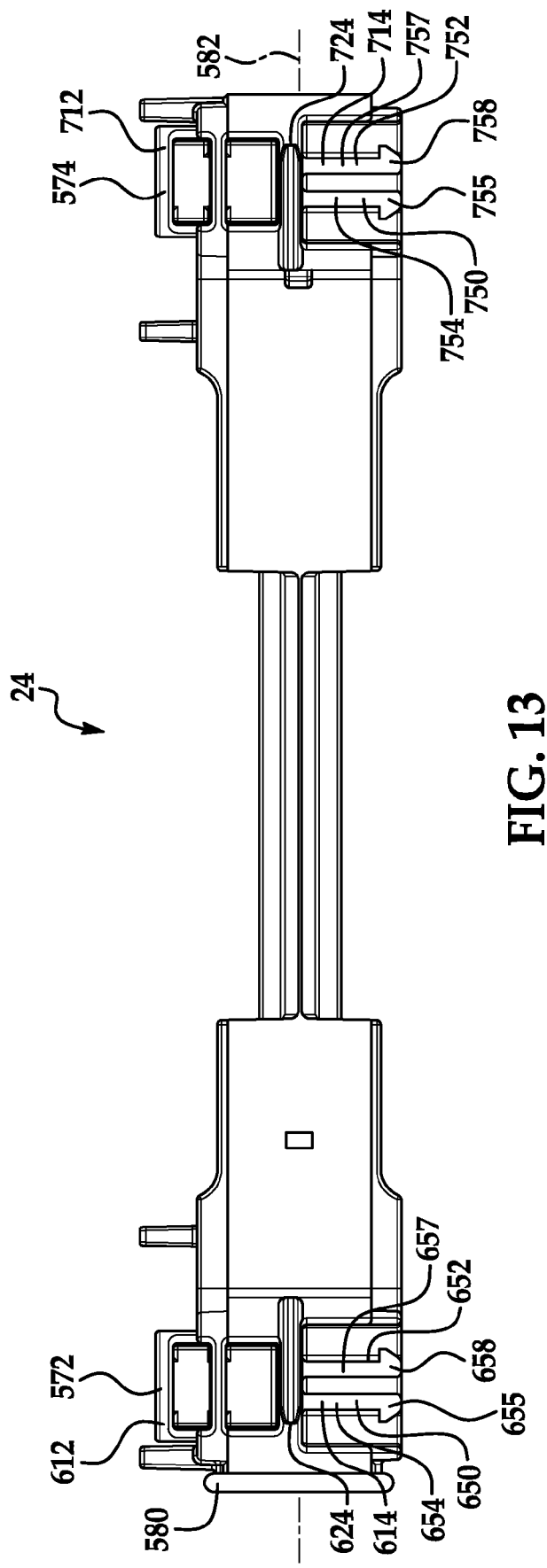
FIG. 13 is a side view of the third frame assembly of FIG. 12.
Figure 14:
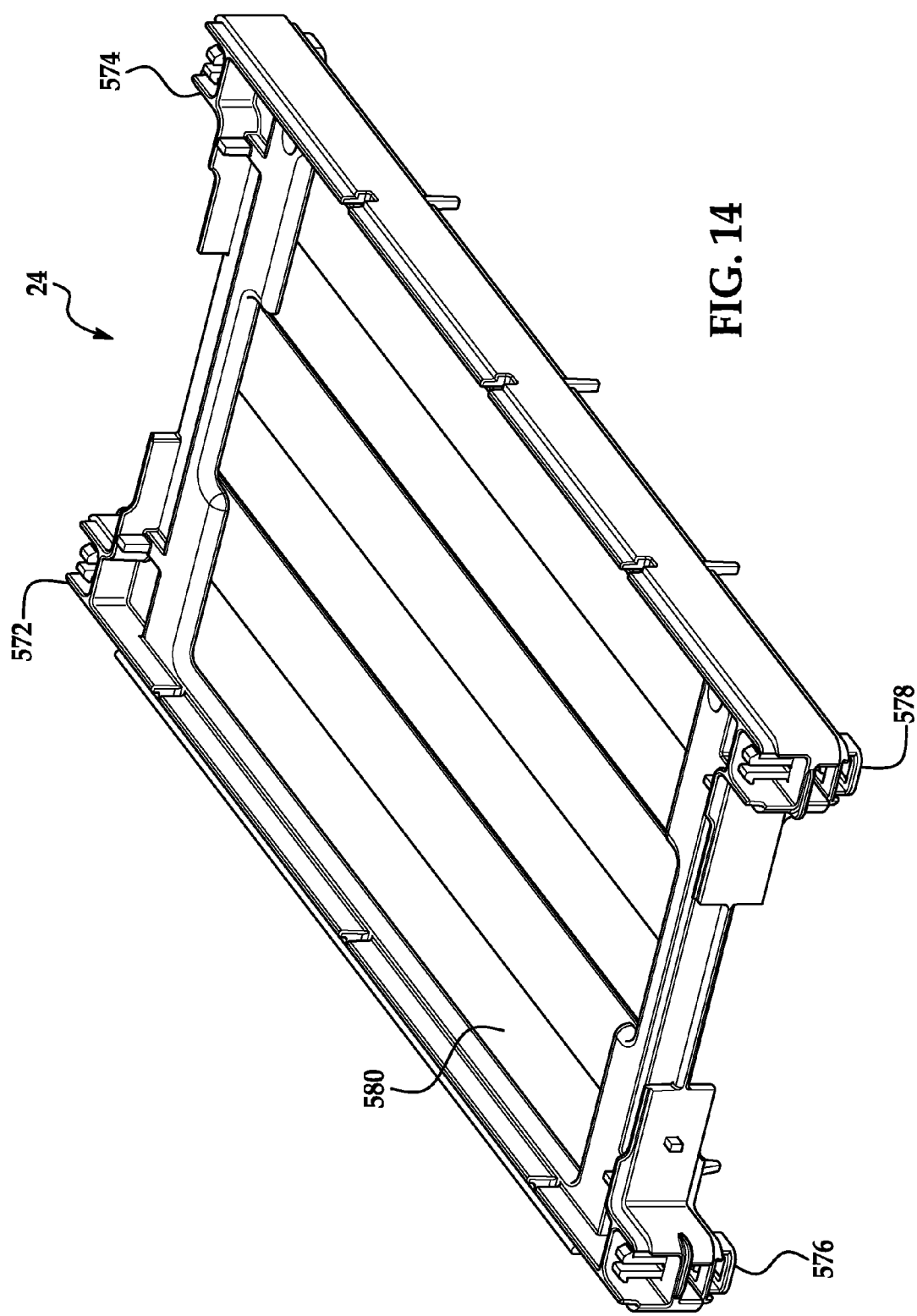
FIG. 14 is another schematic of the third frame assembly of FIG. 12.

Referring to FIGS. 3 and 13, the tongue portion 614 includes resilient arm members 650, 652. The resilient arm members 650, 652 are coupled to the horizontal wall 624 and extend downwardly from the horizontal wall 624 substantially parallel to one another. Further, the resilient arm members 650, 652 are spaced apart from one another and are each disposed between bottom portions of the vertical walls 628, 630. The resilient arm member 650 includes a shaft portion 654 and a latch portion 655 coupled to an end of the shaft portion 654. The resilient arm member 652 includes a shaft portion 657 and a latch portion 658 coupled to an end of the shaft portion 657. The latch portions 655, 658 of the resilient arm members 650, 652, respectively, removably engage an engagement surface 1112 (shown in FIG. 3) of the coupling member 1062 (shown in FIG. 16).

Referring to FIGS. 3 and 12, the coupling member 574 is coupled to and extends outwardly from the first side wall 600 in the first direction. The coupling member 574 is coupled proximate to a second end of the first side wall 600.

The coupling member 574 includes a female member 712 and a tongue portion 714 coupled to the female member 712.

The female member 712 includes horizontal walls 720, 722, 724 and vertical walls 728, 730. The horizontal walls 720, 722, 724 extend parallel to one another and parallel to the second plane 582 (shown in FIG. 13) and are spaced apart from one another. The vertical walls 728, 730 are coupled to the horizontal walls 720, 722, 724. The horizontal walls 720, 722 have a cavity 740 therebetween. The horizontal walls 722, 724 have a cavity 742 therebetween. The horizontal wall 724 and the vertical walls 728, 730 define a cavity 744 on a side of the horizontal wall 724 that is opposite to the side of the horizontal wall 724 communicating with the cavity 742. Further, the horizontal wall 720 has an aperture 760 extending therethrough, and has an engagement surface 762 communicating with the cavity 740. The horizontal wall 722 has an aperture 764 extending therethrough. The engagement surface 762 engages the resilient arms 350, 352 of the coupling member 174 of the frame assembly 22.

Referring to FIGS. 3 and 13, the tongue portion 714 includes resilient arm members 750, 752. The resilient arm members 750, 752 are coupled to the horizontal wall 724 and extend downwardly from the horizontal wall 724 substantially parallel to one another. Further, the resilient arm members 750, 752 are spaced apart from one another and are each disposed between bottom portions of the vertical walls 728, 730. The resilient arm member 750 includes a shaft portion 754 and a latch portion 755 coupled to an end of the shaft portion 754. The resilient arm member 752 includes a shaft portion 757 and a latch portion 758 coupled to an end of the shaft portion 757. The latch portions 755, 758 of the resilient arm members 750, 752, respectively, removably engage an engagement surface 1212 (shown in FIG. 3) of the coupling member 1064 (shown in FIG. 16).

Referring to FIGS. 4 and 12, the coupling member 576 is coupled to and extends outwardly from the second side wall 602 in the second direction opposite to the first direction. The coupling member 576 is coupled proximate to a first end of the second side wall 602. The coupling member 576 includes a female member 812 and a tongue portion 814 coupled to the female member 812.

The female member 812 includes horizontal walls 820, 822, 824 and vertical walls 828, 830. The horizontal walls 820, 822, 824 extend parallel to one another and parallel to the second plane 582 (shown in FIG. 13) and are spaced apart from one another. The vertical walls 828, 830 are coupled to the horizontal walls 820, 822, 824. The horizontal walls 820, 822 have a cavity 840 therebetween. The horizontal walls 822, 824 have a cavity 842 therebetween. The horizontal wall 824 and the vertical walls 828, 830 define a cavity 844 on a side of the horizontal wall 824 that is opposite to the side of the horizontal wall 824 communicating with the cavity 842. Further, the horizontal wall 820 has an aperture 860 extending therethrough, and has an engagement surface 862 communicating with the cavity 840. The horizontal wall 822 has an aperture 864 extending therethrough. The engagement surface 862 engages the resilient arms 450, 452 of the coupling member 176 of the frame assembly 22.

Figure 15:
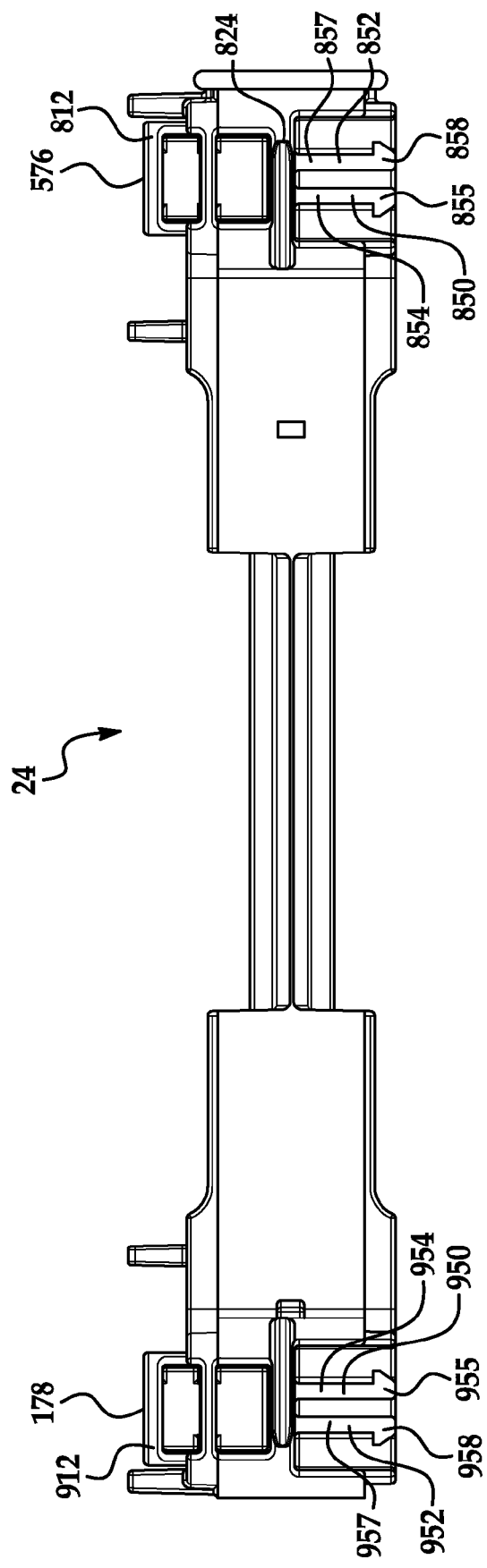
FIG. 15 is another side view of the third frame assembly of FIG. 12.

Referring to FIGS. 4 and 15, the tongue portion 814 includes resilient arm members 850, 852. The resilient arm members 850, 852 are coupled to the horizontal wall 824 and extend downwardly from the horizontal wall 824 substantially parallel to one another. Further, the resilient arm members 850, 852 are spaced apart from one another and are each disposed between bottom portions of the vertical walls 828, 830. The resilient arm member 850 includes a shaft portion 854 and a latch portion 855 coupled to an end of the shaft portion 854. The resilient arm member 852 includes a shaft portion 857 and a latch portion 858 coupled to an end of the shaft portion 857. The latch portions 855, 858 of the resilient arm members 850, 852, respectively, removably engage an engagement surface 1312 (shown in FIG. 4) of the coupling member 1066 (shown in FIG. 16).

Referring to FIGS. 4 and 12, the coupling member 578 is coupled to and extends outwardly from the second side wall 602 in the second direction opposite to the first direction. The coupling member 578 is coupled proximate to a second end of the second side wall 602. The coupling member 578 includes a female member 912 and a tongue portion 914 coupled to the female member 912.

The female member 912 includes horizontal walls 920, 922, 924 and vertical walls 928, 930. The horizontal walls 920, 922, 924 extend parallel to one another and parallel to the second plane 582 (shown in FIG. 13) and are spaced apart from one another. The vertical walls 928, 930 are coupled to the horizontal walls 920, 922, 924. The horizontal walls 920, 922 have a cavity 940 therebetween. The horizontal walls 922, 924 have a cavity 942 therebetween. The horizontal wall 924 and the vertical walls 928, 930 define a cavity 944 on a side of the horizontal wall 924 that is opposite to the side of the horizontal wall 924 communicating with the cavity 942. Further, the horizontal wall 920 has an aperture 960 extending therethrough, and has an engagement surface 962 communicating with the cavity 940. The horizontal wall 922 has an aperture 964 extending therethrough. The engagement surface 962 engages the resilient arms 550, 552 of the coupling member 178 of the frame assembly 22.

Referring to FIGS. 4 and 15, the tongue portion 914 includes resilient arm members 950, 952. The resilient arm members 950, 952 are coupled to the horizontal wall 924 and extend downwardly from the horizontal wall 924 substantially parallel to one another. Further, the resilient arm members 950, 952 are spaced apart from one another and are each disposed between bottom portions of the vertical walls 928, 930. The resilient arm member 950 includes a shaft portion 954 and a latch portion 955 coupled to an end of the shaft portion 954. The resilient arm member 952 includes a shaft portion 957 and a latch portion 958 coupled to an end of the shaft portion 957. The latch portions 955, 958 of the resilient arm members 950, 952, respectively, removably engage an engagement surface 1412 (shown in FIG. 4) of the coupling member 1068 (shown in FIG. 16).

Referring to FIGS. 5 and 12, the frame assembly 24 includes the solid cooling fin 580 having a first panel portion 966 and a second panel portion 967. The first panel portion 966 is at least partially encapsulated within the first, second, third, and fourth side walls 600, 602, 604, 606 of the substantially rectangular ring-shaped frame 570. The first panel portion 966 further extends through the third side wall 604. The second panel portion 967 is coupled to an end of the first panel portion 966 and is disposed directly on an exterior of the third side wall 604. The second panel portion 967 extends substantially perpendicular to the first panel portion 966. The battery cells 44, 46 are disposed directly against at least a portion of first panel portion 966 on opposite side of the first panel portion 966.

Referring to FIGS. 3, 4, 5, 16 and 17, the frame assembly 26 is removably coupled to the frame assembly 24 such that the battery cell 46 is disposed between the frame assemblies 24, 26.

The frame assembly 26 includes a substantially rectangular-shaped frame 1060 and coupling members 1062, 1064, 1066, 1068. The substantially rectangular-shaped frame 1060 has a first end 1080 and a second end 1082. In an exemplary embodiment, the substantially rectangular-shaped frame 1060 and coupling members 1062, 1064, 1066, 1068 are constructed of plastic. Of course, in an alternative embodiment, the substantially rectangular-shaped frame 1060 and coupling members 1062, 1064, 1066, 1068 could be constructed of other electrically insulative materials. A plane 1084 (shown in FIG. 3) extends through the substantially rectangular-shaped frame 1060 and coupling members 1062, 1064, 1066, 1068. The plane 1084 is parallel to the plane 582 (shown in FIG. 13).

Figure 16:
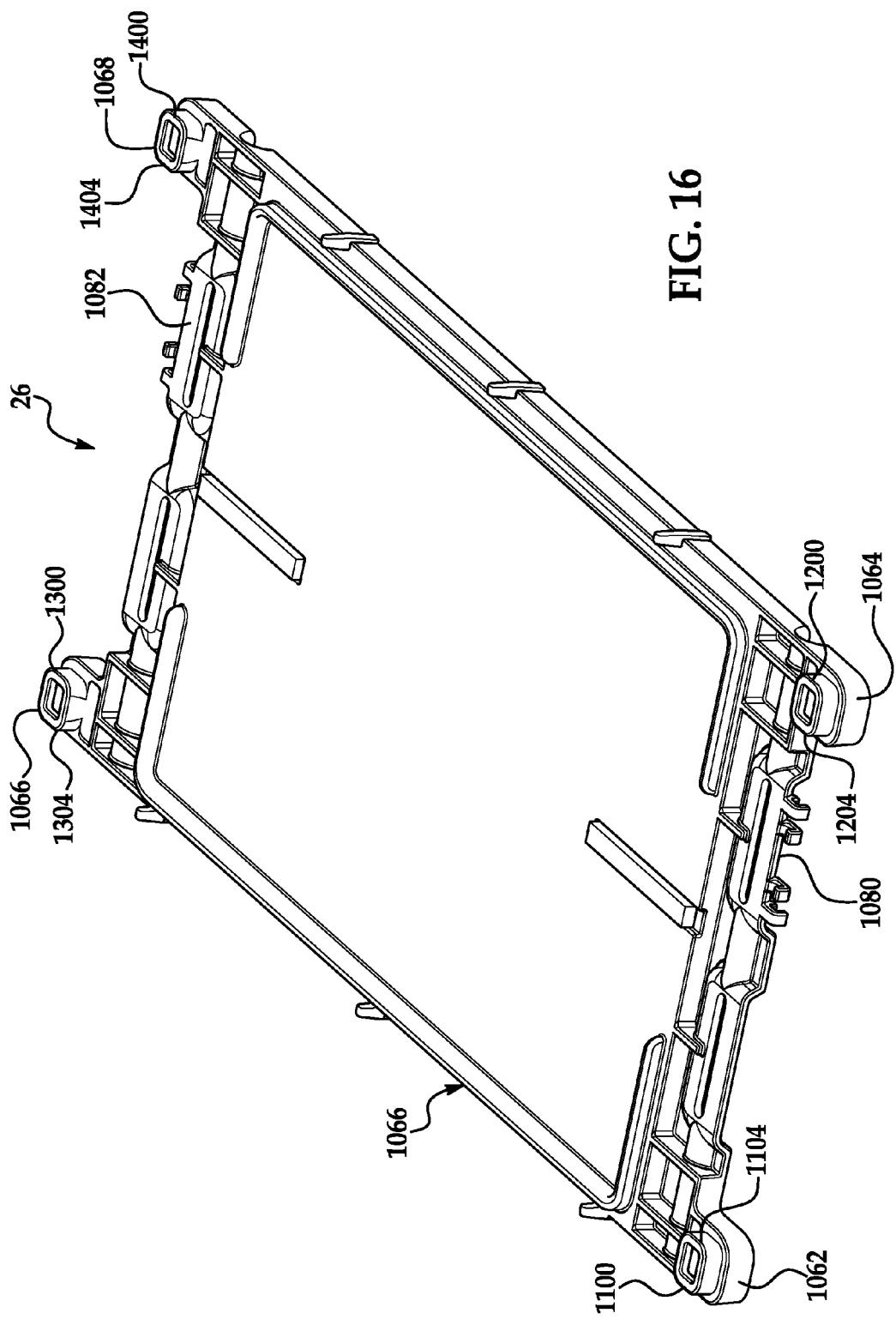
FIG. 16 is a schematic of a fourth frame assembly utilized in the battery cell assembly of FIG. 1.
Figure 17:
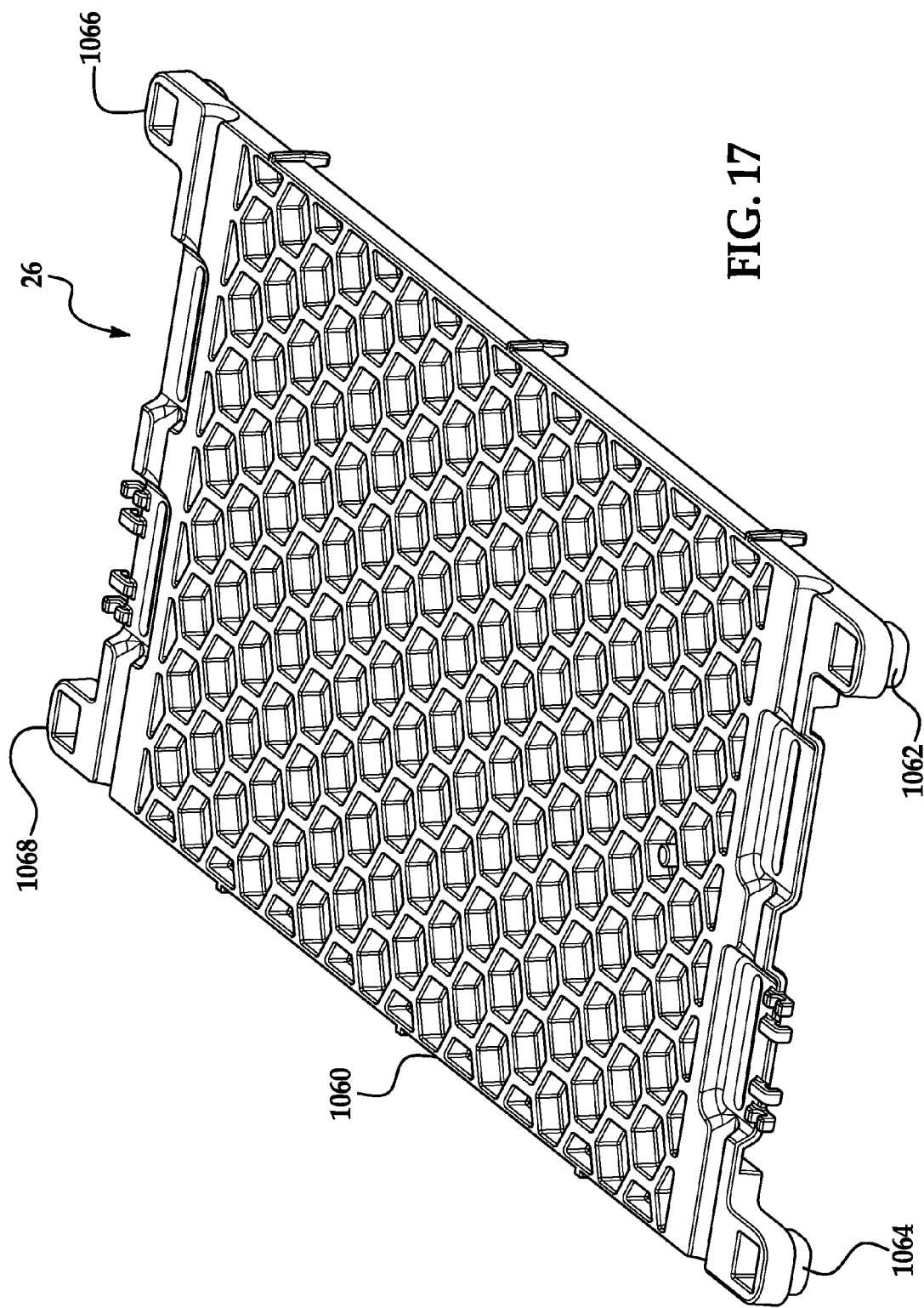
FIG. 17 is another schematic of the fourth frame assembly of FIG. 16.

Referring to FIGS. 3 and 16, the coupling member 1062 is coupled to and extends outwardly from the first end 1080 in the first direction. The coupling member 1062 includes a female member 1100. The female member 1100 includes a horizontal wall 1102 and a substantially rectangular ring-shaped vertical wall 1104. The horizontal wall 1102 extends parallel to plane 1084 (shown in FIG. 3). The substantially rectangular ring-shaped vertical wall 1104 is coupled to the horizontal wall 1102 and extends downwardly from the horizontal wall 1102. The substantially rectangular ring-shaped vertical wall 1104 and the horizontal wall 1102 define a cavity 1114 therebetween. Further, the horizontal wall 1102 has an aperture 1110 extending therethrough and has an engagement surface 1112 communicating with the cavity 1114. The engagement surface 1112 engages the resilient arms 650, 652 of the coupling member 572 of the frame assembly 24.

The coupling member 1064 is coupled to and extends outwardly from the first end 1080 in the first direction. The coupling member 1064 includes a female member 1200. The female member 1200 includes a horizontal wall 1202 and a substantially rectangular ring-shaped vertical wall 1204. The horizontal wall 1202 extends parallel to plane 1084 (shown in FIG. 3). The substantially rectangular ring-shaped vertical wall 1204 is coupled to the horizontal wall 1202 and extends downwardly from the horizontal wall 1202. The substantially rectangular ring-shaped vertical wall 1204 and the horizontal wall 1202 define a cavity 1214 therebetween. Further, the horizontal wall 1202 has an aperture 1210 extending therethrough and has an engagement surface 1212 communicating with the cavity 1214. The engagement surface 1212 engages the resilient arms 750, 752 of the coupling member 574 of the frame assembly 24.

Referring to FIGS. 4 and 16, the coupling member 1066 is coupled to and extends outwardly from the second end 1082 in the second direction opposite to the first direction. The coupling member 1066 includes a female member 1300. The female member 1300 includes a horizontal wall 1302 and a substantially rectangular ring-shaped vertical wall 1304. The horizontal wall 1302 extends parallel to plane 1084 (shown in FIG. 3). The substantially rectangular ring-shaped vertical wall 1304 is coupled to the horizontal wall 1302 and extends downwardly from the horizontal wall 1302. The substantially rectangular ring-shaped vertical wall 1304 and the horizontal wall 1302 define a cavity 1314 therebetween. Further, the horizontal wall 1302 has an aperture 1310 extending therethrough and has an engagement surface 1312 communicating with the cavity 1314. The engagement surface 1312 engages the resilient arms 850, 852 of the coupling member 576 of the frame assembly 24.

The coupling member 1068 is coupled to and extends outwardly from the second end 1082 in the second direction opposite to the first direction. The coupling member 1068 includes a female member 1400. The female member 1400 includes a horizontal wall 1402 and a substantially rectangular ring-shaped vertical wall 1404. The horizontal wall 1402 extends parallel to plane 1084 (shown in FIG. 3). The substantially rectangular ring-shaped vertical wall 1404 is coupled to the horizontal wall 1402 and extends downwardly from the horizontal wall 1402. The substantially rectangular ring-shaped vertical wall 1404 and the horizontal wall 1402 define a cavity 1414 therebetween. Further, the horizontal wall 1402 has an aperture 1410 extending therethrough and has an engagement surface 1412 communicating with the cavity 1414. The engagement surface 1412 engages the resilient arms 950, 952 of the coupling member 578 of the frame assembly 24.

Referring to FIG. 5, the battery cell 40 has a rectangular-shaped body 1500 and electrical terminals 1502, 1504. The electrical terminals 1502, 1504 extend outwardly from first and second ends, respectively, of the rectangular-shaped body 1500. In an exemplary embodiment, the battery cell 40 is a lithium-ion pouch-type battery cell.

The battery cell 42 has a rectangular-shaped body 1510 and electrical terminals 1512, 1514. The electrical terminals 1512, 1514 extend outwardly from first and second ends, respectively, of the rectangular-shaped body 1510. In an exemplary embodiment, the battery cell 42 is a lithium-ion pouch-type battery cell.

The battery cell 44 has a rectangular-shaped body 1520 and electrical terminals 1522, 1524. The electrical terminals 1522, 1524 extend outwardly from first and second ends, respectively, of the rectangular-shaped body 1520. In an exemplary embodiment, the battery cell 44 is a lithium-ion pouch-type battery cell.

The battery cell 46 has a rectangular-shaped body 1530 and electrical terminals 1532, 1534. The electrical terminals 1532, 1534 extend outwardly from first and second ends, respectively, of the rectangular-shaped body 1530. In an exemplary embodiment, the battery cell 46 is a lithium-ion pouch-type battery cell.

The battery cell assembly described herein provides a substantial advantage over other battery cell assemblies. In particular, an advantage of the battery cell assembly is that the frame assemblies therein each have coupling members with tongue portions having resilient arm members, and coupling members with female members that can easily couple the frame assemblies together.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery cell assembly, comprising:
  a first frame assembly having a first substantially rectangular ring-shaped frame and a first coupling member such that a first plane extends through the first substantially rectangular ring-shaped frame and the first coupling member;
  the first coupling member of the first frame assembly being coupled to and extending outwardly from a first side wall of the first substantially rectangular ring-shaped frame in a first direction, the first coupling member of the first frame assembly being coupled proximate to a first end of the first side wall of the first substantially rectangular ring-shaped frame, the first coupling member of the first frame assembly having a first tongue portion with a first resilient arm member and a second resilient arm member;
  a second frame assembly having a second substantially rectangular ring-shaped frame and a first coupling member such that a second plane extends through the second substantially rectangular ring-shaped frame and the first coupling member thereof;
  the first coupling member of the second frame assembly being coupled to and extending outwardly from a first side wall of the second substantially rectangular ring-shaped frame in the first direction, the first coupling member of the second frame assembly being coupled proximate to a first end of the first side wall of the second substantially rectangular ring-shaped frame, the first coupling member of the second frame assembly having a female member with a first aperture; such that the first and second resilient arm members of the first tongue portion of the first coupling member of the first frame assembly extend through the first aperture and engage an engagement surface defined by the female member of the first coupling member of the second frame assembly to couple the first frame assembly to the second frame assembly; and
  a first battery cell disposed between the first frame assembly and the second frame assembly.

2. The battery cell assembly of claim 1, wherein the first coupling member of the first frame assembly having a female member disposed above the first tongue portion of the first coupling member of the first frame assembly, the female member of the first coupling member of the first frame assembly having a second aperture;
  the battery cell assembly further comprising a third frame member assembly having a third coupling member, the third coupling member having a second tongue portion with a first resilient arm member and a second resilient arm member, such that the first and second resilient arm members of the second tongue portion of the third coupling member of the third frame assembly extend through the second aperture and engage an engagement surface defined by the female member of the first coupling member of the first frame assembly to couple the first frame assembly to the third frame assembly.

3. The battery cell assembly of claim 1, wherein the first coupling member of the second frame assembly having a second tongue portion with a first resilient arm member and a second resilient arm member, the second tongue portion being disposed below the female member of the first coupling member of the second frame assembly;
  the battery cell assembly further comprising a third frame assembly having a third coupling member with a female member, the female member of the third coupling member of the third frame assembly having a second aperture, such that the first resilient arm member and the second resilient arm member of the second tongue portion of the first coupling member of the second frame assembly extend through the second aperture and engage an engagement surface defined by the female member of the third coupling member to couple the second frame assembly to the third frame assembly.

4. The battery cell assembly of claim 1, wherein the first substantially rectangular ring-shaped frame having the first side wall thereof, a second side wall, a third side wall, and a fourth side wall; the first and second side walls of the first substantially rectangular ring-shaped frame extending substantially parallel to one another and being coupled to and between the third and fourth side walls, the third and fourth side walls extending substantially parallel to one another and substantially perpendicular to the first and second side walls of the first substantially rectangular ring-shaped frame.

5. The battery cell assembly of claim 4, wherein the first frame assembly further includes a second coupling member, a third coupling member, and a fourth coupling member.

6. The battery cell assembly of claim 5, wherein the second coupling member being coupled to and extending outwardly from the first side wall of the first substantially rectangular ring-shaped frame in the first direction, the second coupling member being coupled proximate to a second end of the first side wall of the first substantially rectangular ring-shaped frame.

7. The battery cell assembly of claim 6, wherein the third coupling member being coupled to and extending outwardly from the second side wall of the first substantially rectangular ring-shaped frame in a second direction opposite to the first direction, the third coupling member being coupled proximate to a first end of the second side wall.

8. The battery cell assembly of claim 7, wherein the fourth coupling member being coupled to and extending outwardly from the second side wall of the first substantially rectangular ring-shaped frame in the second direction, the fourth coupling member being coupled proximate to a second end of the second side wall.

9. The battery cell assembly of claim 4, wherein the first frame assembly further includes a solid cooling fin having a first panel portion and a second panel portion, the first panel portion being least partially encapsulated within the first, second, third, and fourth side walls of the first substantially rectangular ring-shaped frame, the first panel portion further extending through the third side wall, the second panel portion being coupled to an end of the first panel portion and being disposed directly on an exterior of the third side wall, the first battery cell being disposed directly against at least a portion of the first panel portion.

10. The battery cell assembly of claim 1, wherein:
the first coupling member of the first frame assembly having the first tongue portion and a female member thereof;
the female member of the first coupling member of the first frame assembly being defined by first, second, and third horizontal walls, and first and second vertical walls; the first, second, and third horizontal walls extending parallel to one another and parallel to the first plane and being spaced apart from one another, the first and second vertical walls being coupled to the first, second, and third horizontal walls; the first and second horizontal walls having a first cavity defined therebetween; the second and third horizontal walls having a second cavity defined therebetween; the first and second horizontal walls having second and third apertures, respectively, extending therethrough;
the first resilient arm member and the second resilient arm member of the first tongue portion of the first coupling member of the first frame assembly being coupled to and extending from the third horizontal wall.

11. The battery cell assembly of claim 1, wherein the first frame assembly is constructed of plastic, and the second frame assembly is constructed of plastic.

* * * * *